(12) United States Patent
Calabrese

(10) Patent No.: US 8,076,945 B2
(45) Date of Patent: Dec. 13, 2011

(54) AUTOSENSITIVE DETECTOR AND MEASUREMENT SYSTEM

(76) Inventor: Ronald V. Calabrese, Addison, IL (US)

( * ) Notice: Subject to any disclaimer, the term of this patent is extended or adjusted under 35 U.S.C. 154(b) by 436 days.

(21) Appl. No.: 12/109,998

(22) Filed: Apr. 25, 2008

(65) Prior Publication Data

US 2008/0265909 A1  Oct. 30, 2008

Related U.S. Application Data

(60) Provisional application No. 60/914,205, filed on Apr. 26, 2007.

(51) Int. Cl.
*G01R 1/02* (2006.01)
*F25D 21/06* (2006.01)
*G08B 21/00* (2006.01)

(52) U.S. Cl. ........... 324/601; 324/130; 62/154; 340/620

(58) Field of Classification Search .................. 324/601, 324/130; 340/620; 62/154
See application file for complete search history.

(56) References Cited

U.S. PATENT DOCUMENTS

| 5,781,024 | A | * | 7/1998 | Blomberg et al. | ............ | 324/763 |
| 6,124,793 | A | * | 9/2000 | Knutson | ........................ | 340/584 |
| 2005/0172649 | A1 | * | 8/2005 | Bunch et al. | ..................... | 62/154 |

* cited by examiner

*Primary Examiner* — Melissa Koval
*Assistant Examiner* — Farhana Hoque
(74) *Attorney, Agent, or Firm* — Vedder Price P.C.

(57) ABSTRACT

This disclosure relates to an autosensitive detector and an autosensitive measurement system with a self-adjustable set-off value, and more specifically, to a probe for adaptation to an environmental parameter such as liquids adapted to reset its measured sensitivity each time the probe is enabled or turned on, which can be further desensitized by adjusting a sensitivity correction factor by a factor (F) within the range of 0.05<F<2.01 of the reset sensitivity or of up to ten times or ten percent of the reset sensitivity but most likely of 10 to 20% from the initial value using a remote control system such as a handheld programmer or programming function of the sensor board.

20 Claims, 5 Drawing Sheets

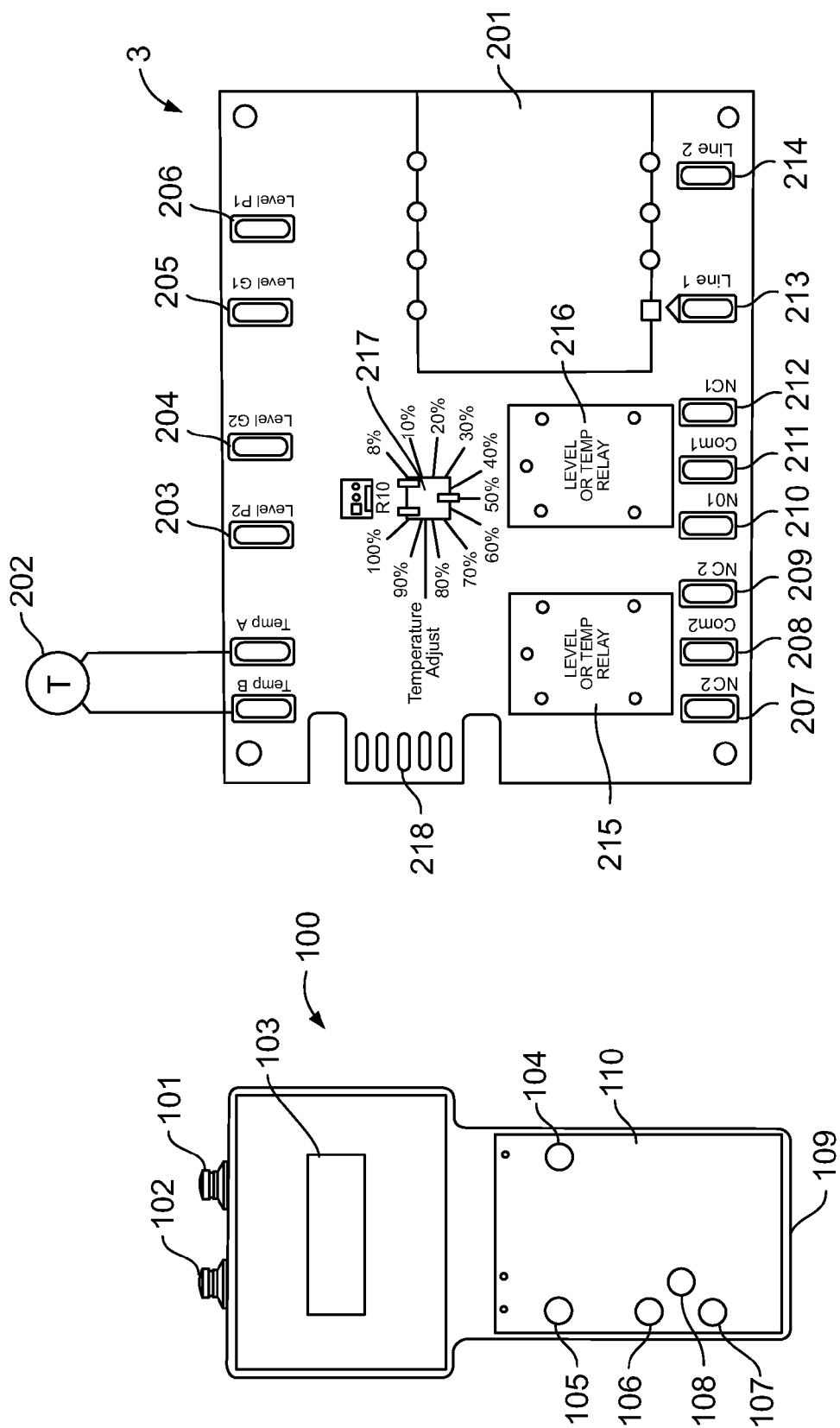

AUTOSENSITIVE DETECTOR AND MEASUREMENT SYSTEM

CROSS-REFERENCE TO RELATED APPLICATION

The present patent application claims priority from and the benefit of U.S. Provisional Patent Application No. 60/914,205, filed Apr. 26, 2007, and entitled Auto-Sensitive Conductivity Detection System, which prior application is hereby incorporated herein by reference.

FIELD OF THE DISCLOSURE

This disclosure relates to an autosensitive detector and autosensitive measurement system with a self-adjustable set-off value, and more specifically, this disclosure relates to a probe for adaptation to an environmental parameter adapted to reset its measure sensitivity each time the probe is enabled and can be further desensitized by adjusting a sensitivity correction factor of the set-off value via a control system.

BACKGROUND

Sensors measure environmental parameters such as luminosity, humidity, wind speed, and the presence of liquids at different points in time and space. For example, fluid levels, fluid temperatures, the presence of a liquid, fluid viscosity, and fluid velocity are all measurable parameters.

Detection technology relies on sensors to interact and measure our world. These sensors, when part of a probe, detect the evolution of any of a large plurality of environmental parameters. Some sensors are programmed to measure continuously the parameter they are following, while other sensors are programmed to set off using, for example, a relay, once a programmed cut-off value is reached. The current disclosure is mostly directed at set-off detectors with cut-off values.

Many types of sensor-based probes exist, including, for example, mechanical sensors, floats, electromechanical sensors, radars, visual sensors, weight sensors, laser sensors, ultrasonic sensors, fluid resistance/conductivity sensors, and even capacitance sensors. While the described technology applies equally to each of these technologies, what is contemplated and disclosed as a first embodiment is the use of the technology adapted for the measure of the resistance or the conductance of fluids, and more precisely as shown in one embodiment, a measure of the conductivity between two conductive probes spaced at a short distance in a fluid to determine the resistance of the volume of fluid between the two probes.

Probes without automatic sensitivity settings are known in the art. Lumenite Control Technology, Inc., the assignee of the current invention, markets a system without automatic sensitivity setting as a microprocessor-based pasteurization testing system shown as prior art as FIG. 1. The MTC-2000 as shown on FIG. 1 measures the velocity of milk in a heated tube as required by the FDA in the milk pasteurization process. The U.S. Public Health Code requires pasteurization of milk to be conducted at a temperature of at least 160° F. at a minimum duration of 15 seconds. In operating conditions, heated milk runs along a heated serpentine tube shown at the bottom of FIG. 1. The control of the fluid velocity allows for a determination of the time of passage by a reverse calculation from the time needed to travel the distance between both probes along the line.

Since water has a viscosity and thermal inertia close to that of milk, testing can be conducted using water instead of milk. Two probes are placed in series along the holding tube. The resistance-based probes are designed to prevent the accumulation and growth of bacteria and fungi where the probes are connected using a hex nut. U.S. Pat. No. 2,470,066 to G. V. Calabrese describes an electrode assembly with different probes having hex nuts that may be used during the pasteurization process. This patent is hereby incorporated by reference.

The probes are made of two partly insulated conductive rods placed side-by-side to measure the electrical resistance value of the fluid located between the rods. The use of two rods allows for measurement of two elements placed at different voltages. Once the flow of water is established, a baseline resistance is measured, a value generally within the range of 500Ω to 200,000Ω, or a range of 100Ω to 50,000Ω based on the device. Ranges are variable and depend upon the different parameters of the detection device. Using a variable resistance set-off dial, a user sets a fixed set-off value based on the estimated value of the resistance of the water in the system before measurement using the MTC-2000 begins.

To measure the time needed for fluid to travel from the first probe to the second probe, a liquid having a different electrical conductivity is introduced in the line before the first probe. A MTI-1000 liquid injection apparatus, also from Lumenite Control Technology, Inc., can be used to introduce a saline solution. When the solution reaches the first probe, the resistance drops sharply below the set-off value of the first probe to trigger the relay. The microprocessor of the MTC-2000 then measures the time until a similar drop at the second probe occurs. If the set-off value trigger point is not far enough from the baseline resistance of the probe, false positives can be measured as the saline water mixes with water.

In addition, the actual value of the resistance can be offset by a plurality of factors. For example, if milk has formed a dried layer over the probe body, the measured resistance increases significantly. If the water source contains more electrolytes, the measured resistance drops.

One of the major drawbacks of this system is the inherent variability of the resistance and conductivity measurements between the two rods in the probes. While the conductivity or resistance of the water must be initially measured to obtain a baseline, this value can oscillate within a margin of error and have other small variations. Once the average value of the water resistance is determined, the operator must then fix a detection level that signals the arrival at the probes of a fluid having higher conductivity. For example, if a resistance of 10,000Ω is measured for the water, then this value must be calibrated. The detection level of the saline solution must also be entered, for example, at 5,000Ω. What is needed is an autosensitive probe and system capable of automatic adjustment that does not require user estimations.

SUMMARY

This disclosure relates to an autosensitive detector and an autosensitive measurement system with a self-adjustable set-off value, and more specifically, to a probe for adaptation to an environmental parameter such as liquids adapted to reset its measured sensitivity each time the probe is enabled or turned on, which can be further desensitized by adjusting a sensitivity correction factor by a factor (F) within the range of $0.05<F<2.01$ of the reset sensitivity or of up to ten times or ten percent of the reset sensitivity but most likely of 10 to 20% from the initial value using a remote control system such as a handheld programmer or programming function of the sensor board.

BRIEF DESCRIPTION OF THE DRAWINGS

Certain preferred embodiments are shown in the drawings. However, it is understood that the present disclosure is not limited to the arrangements and instrumentality shown in the attached drawings.

FIG. 4 is an external representation of the external casing of the MTC-3000 Milk Pasteurizing and Testing Control system with the autosensitive feature of this disclosure.

FIG. 5 is an illustration of a possible probe board according to another embodiment of the present disclosure.

DETAILED DESCRIPTION

Figure 1:
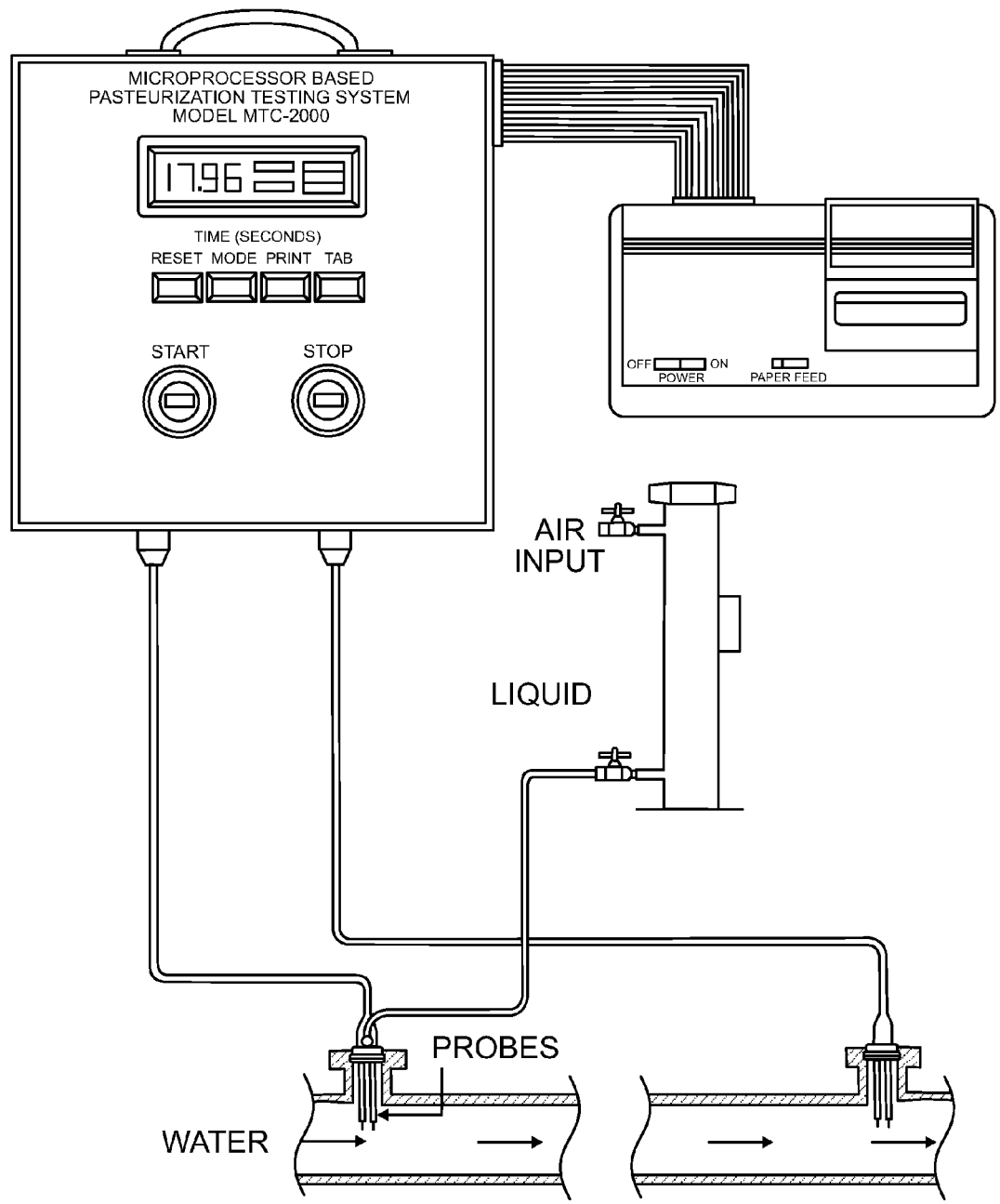
FIG. 1 is an illustration of a prior art device known as the MTC-2000 Milk Pasteurizing and Testing Control system without the autosensitive feature of this disclosure.

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

Figure 6:
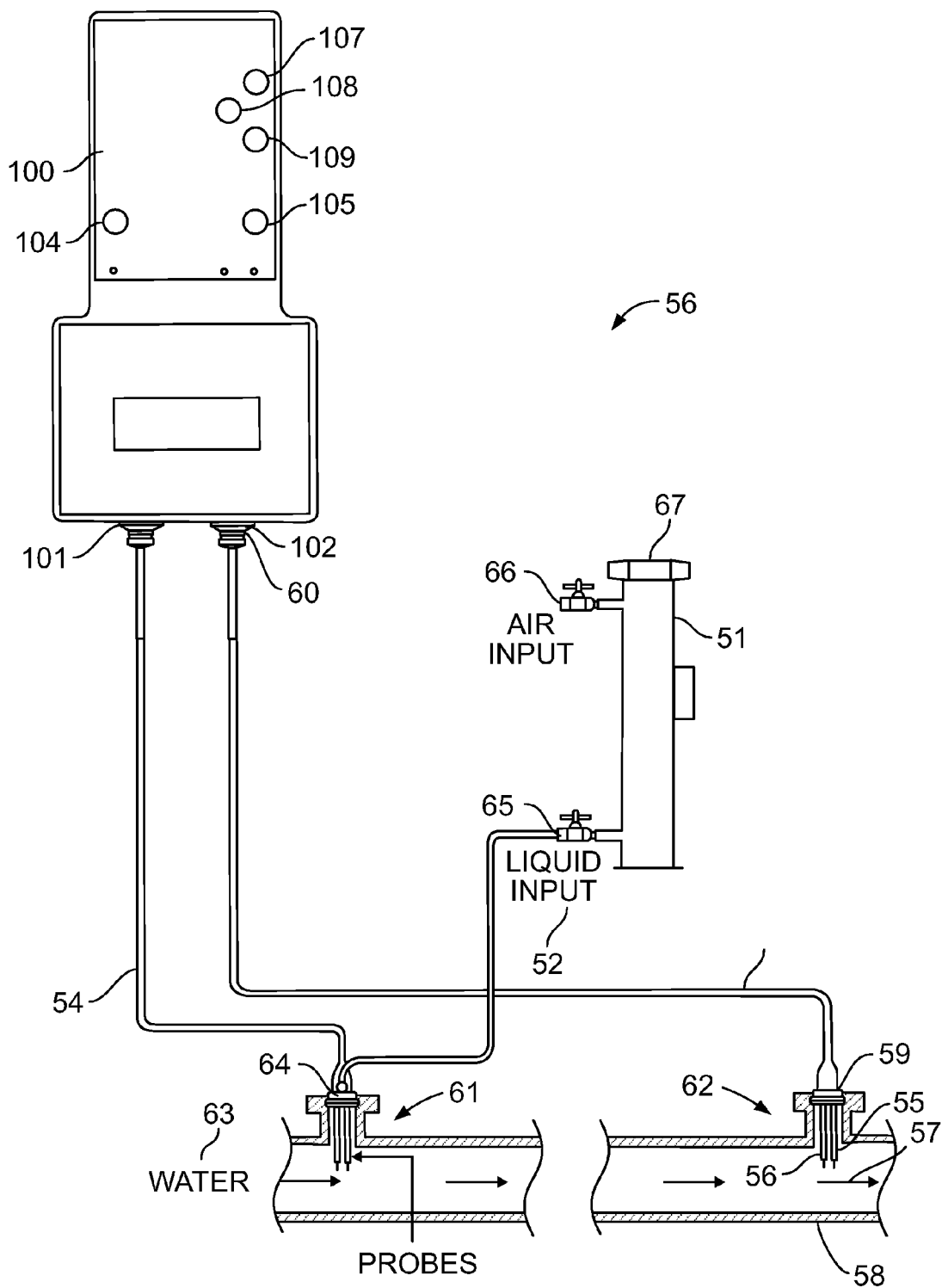
FIG. 6 is an illustration of the full MTC-3000 Milk Pasteurizing and Testing Control system with the autosensitive feature of this disclosure.

What is disclosed is a new autosensitive detector and measurement system that can be implemented on any and all sensors. In one embodiment, this new technology, called the MTC-3000, is implemented as part of a resistance- and conductance-based dual-probe system where water and saline water are measured by the probes. This embodiment as shown in FIG. 6 is a new generation pasteurizing and testing control system 56. When compared with what is known in the prior art as shown in FIG. 1, the new device does not require turn pots or variable measurement of the different resistances.

Figure 3:
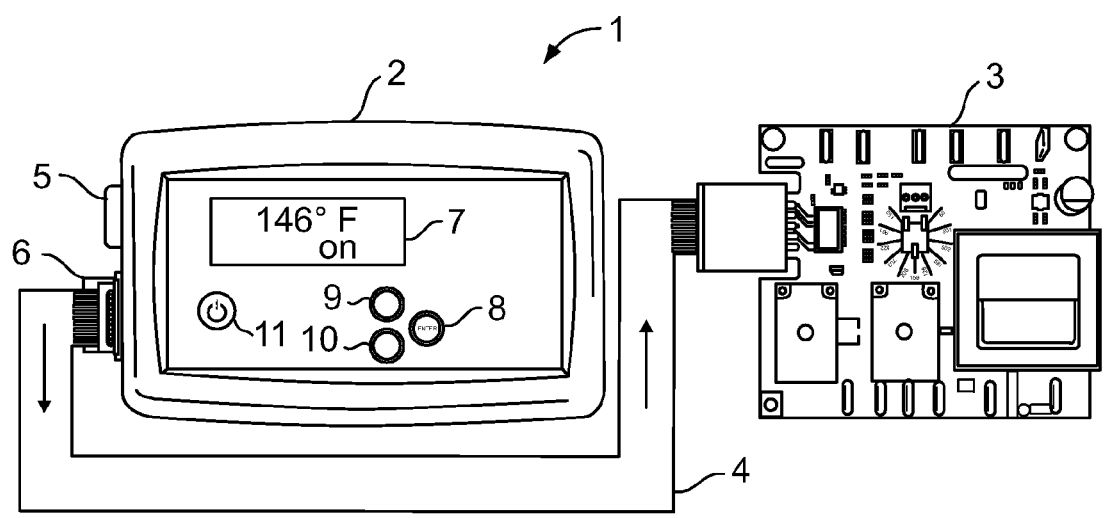
FIG. 3 is an illustration of a control system used by the autosensitive detector connected via a ribbon cable to a probe board according to another embodiment of the present disclosure.

The external casing 104 of the MTC-3000 100 as shown in FIG. 4 includes two probe connections 101, 102 for the start probe 102 and the stop probe 101, respectively. The MTC-3000 100 also includes a display 103 where the different commands are shown, including a power on/off button 105, a start button 104 for the start of the measurement, and three buttons 106, 107, 108 to operate the interface of the system based on the information shown on the display 103. Button 106 in one embodiment is a scroll up button, button 107 is a scroll down button, and button 108 is an enter button. In one embodiment, a USB port 109 is attached to the bottom end of the device. The inside portion of the MTC-3000 can include what is shown in FIG. 3 but rearranged based on the needs of different interface configurations.

FIG. 6 shows the system 56 with the MTC-3000 100 connected via the two probe connections 101, 102, to the tube 58. Water 63 or a source of liquid to be measured for resistance or conductance travels in the tube 58 as shown by the arrows 57. While water moving in a tube is shown, what is contemplated is the use of any fluid or other medium moving in any type of geometry. By way of nonlimiting example, an autosensitive detector can be made to measure irradiation from a nuclear power plant engine using a gamma detector placed next to a lead shield. FIG. 6 further discloses the use of a saline water source 51 capable of injecting low-resistance fluid into the first probe 61 at the orifice 64 using a liquid input valve 65 and an air input valve 67 for allowing flow of the saline solution inside a cylinder 67. The probe connectors 101, 102 are connected to the first probe 61 and the second probe 62, respectively, using cables 54, 53.

FIG. 5 shows one possible embodiment of a probe board 3. The board 3 includes a first connector 218 for connection to a control system 2 as shown in FIG. 3 having a second connector 6. In one embodiment, a flat ribbon cable 4 is used to connect the first connector 218 with the second connector 6. While one method of connection is shown, what is contemplated is the use of any connection, either hard- or soft-wired, in software or hardware where two functional elements such as an autosensitive detector board 3 are connected to a control system 2.

Returning to FIG. 5, the board 3 includes a first level or temperature relay 215 and a second level or temperature relay 216, each connected with a NO, COMMON, and NC connection shown as elements 207 to 212, respectively. The board 3 further includes an input for an RTD, a thermister, or a thermocouple 202, and intrinsically safe VAC probe to ground sensitive signals 203 to 206. While one possible configuration of board 3 is shown, what is contemplated is the use of any number of relays, sensitive signals, or inputs to satisfy the requirement of the different probes to be connected to the board 3. The board further includes processing and calculation capacities, including but not limited to an algorithm designed to fix and manipulate the different set-off values associated with the different probes.

FIG. 3 is an illustration of a control system 2 used by the autosensitive detector 1 connected via a ribbon cable 4 to a probe board 3 according to another embodiment of the present disclosure. The device has other interfaces 5, a display 7, a power button 11, an enter button 8, a scroll up button 9, and down buttons 10 to enter information in the control system 2 that in turn relays the information via the ribbon cable 4 back to the board 3 and ultimately where it controls any probes attached to the board 3.

In FIG. 6, the rods 56, 57 of the probes 61, 62 can detect a level instead of the velocity of a fluid with which it comes into contact. In the case of a level detector, humidity, drips of water, foam, evaporation, condensation, calcium deposits, and other agents can accumulate and modify over time the overall resistance between the rods 56, 57 or a rod 56 or 57 and the probe or a tank wall shown as 58 if the tube is analogized to a tank. If a probe 61, 62 is set for a fixed level of detection value (e.g., 1000Ω) when in contact with the fluid, changes to the properties of the fluid or the appearance of electrical insulation between the first rod 56 and the second rod 57 or the tank wall 58 lower the detection capacity of the probe. For example, if the fluid becomes more conductive and has foam, early contact of the foam with the rod 55, 56 might result in early detection of the set-off value by the probe 61 or 62 even if the probe 61 or 62 is not yet submerged. In one preferred embodiment, the liquid level controls have a default (minimum) sensitivity of 500Ω probe to ground. Once the liquid contacts the probe 61, 62, the autosensitive measurement system 56 or detector 1 determines a baseline resistance and multiplies that value with a sensitivity correction factor to obtain a corrected set-off value.

In one embodiment, the sensitivity correction factor is a value of 1 to 10 in order to increase the corrected set-off value up to 1000% of the baseline value. In another embodiment where sensitivity is decreased and the sensitivity correction factor must be a fraction of the baseline value, the factor contemplated is 1 to 0.1 to decrease the corrected set-off value down to 10% of the baseline value. In yet another embodiment, the correction factor is a value in the range of 1 to 1.2 or an increase of up to 20% of the baseline value, which is also referred to as the noncorrected set-off value. If the correction factor must decrease the baseline value, the other embodiment will have a correction factor of 1 to 0.8 for a decrease of 20% from the baseline resistance. In one embodiment, the correction factor (F) is within the range of $0.05<F<2.01$ of the reset sensitivity or of up to ten times or ten percent of the reset sensitivity but most likely of 10 to 20% from the initial value. Finally, in yet another embodiment, a sensitivity correction factor of approximately 1.1 is contemplated as an increase in the baseline value to the corrected set-off value of 10%.

Figure 2:
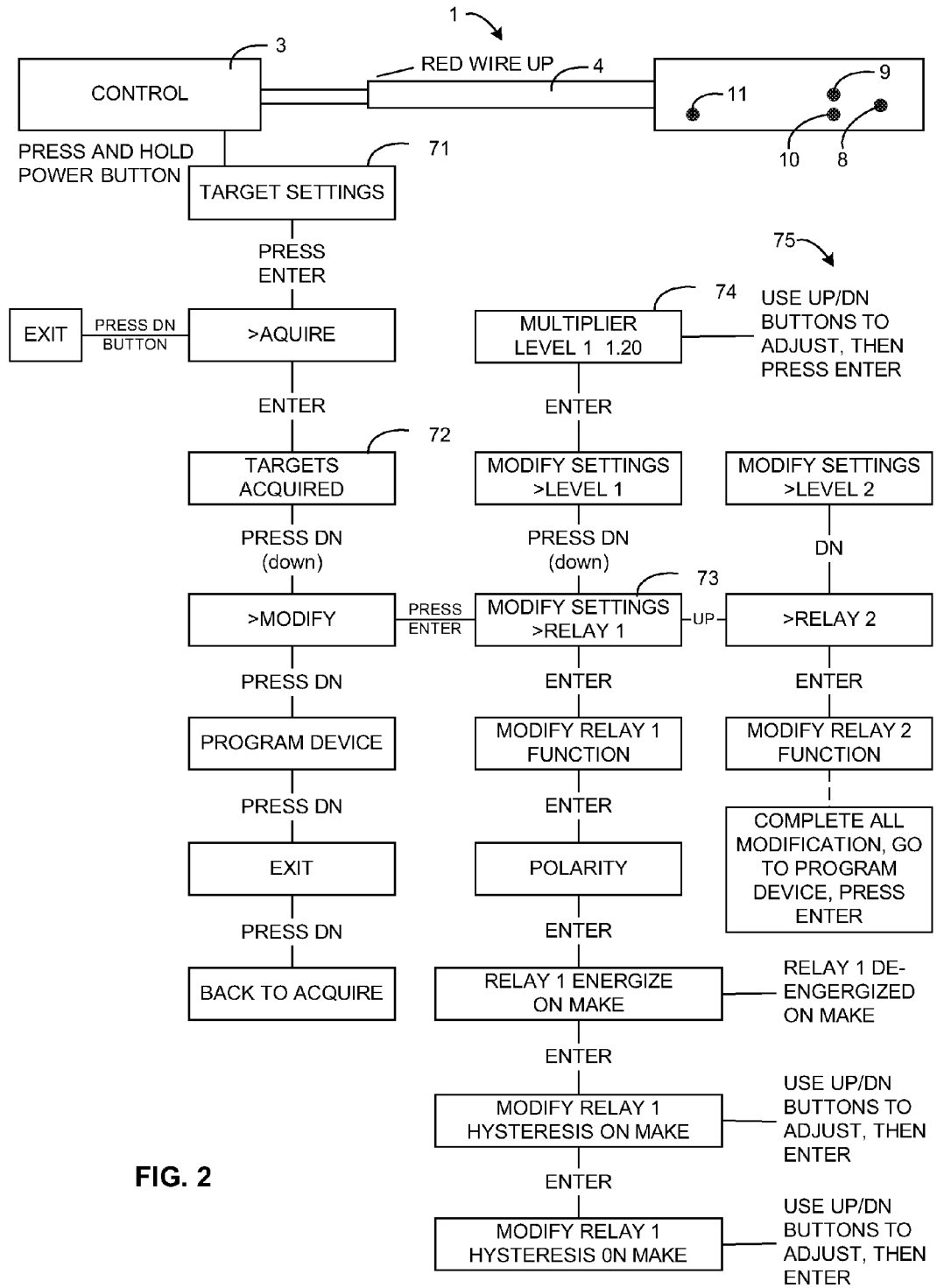
FIG. 2 is a diagram of the programming logic of a control system of the autosensitive detector as implemented on a control board according to a possible embodiment of the present disclosure.

FIG. 2 is a schematic diagram that illustrates how the sensitivity correction factor or any other parameter from the board 3 can be modified. Illustratively, in order to adjust the value of the multiplier level 1, the following commands are entered: first the power button is held in place until the display reads TARGET SETTINGS 71, the enter button 8 is pressed twice until it reads TARGETS ACQUIRED 72. The down button 10 is pressed once and then the enter button 8 is pressed to enter the MODIFY SETTINGS RELAY 1 in directory 73. The down button 10 is pressed once and the enter button is finally pressed to enter the MULTIPLIER LEVEL 1 1.20 multiplier 74. In this example, the correction factor is set at 1.20 and can then be adjusted by pressing either of the buttons 9, 10 until the desired value is reached 75.

In one embodiment, the MTC-3000 tester is programmed to conduct a series of consecutive measures of velocity in order to determine an average velocity. The new autosensitive MTC-3000 control allows for the device to take an initial reading of the value and then ask the user to enter a variability value for the correction factor for the set-off value.

In an embodiment shown in FIG. 6, the autosensitive detector 56 includes a probe 56, 57 with a sensor 61, 62 for detecting evolution of an environmental parameter, such as the resistance of water. The detector 56 also includes a control system 2 as shown in FIG. 3 with a probe corrected set-off value as described connected to the probe 56, 57 for setting off the probe 56, 57 when the environmental factor evolves past the corrected probe set-off value. The corrected probe set-up value is calculated by measuring a first noncorrected probe set-up value of the environmental parameter using the sensor in contact with the environmental parameter and correcting the noncorrected probe set-up value by a sensitivity correction factor as described.

In one embodiment, the probe 56, 57 is a fluid-to-ground resistance probe, and the environmental parameter is the electrical conductivity of a fluid such as water. In another embodiment, the noncorrected probe set-up value is the resistance between the fluid as a baseline measure (i.e., before the saline solution 51 is placed in the system) and the ground resistance probe with the probe in regular operating conditions.

In another embedment, the autosensitive measurement system 56 includes a set-off value, with an autosensitive detector 100 having a first connector, a probe, a ground, a command with a noncorrected set-off value, and a sensitivity correction factor; and a control system with an interface and a second connector connected to the first connector for modifying the sensitivity correction factor via the interface, wherein the set-off value is calculated at each initialization of the autosensitive detector by multiplying the measure of a resistance between the probe and the ground.

In another embodiment, the autosensitive detector 1 includes at least a probe 56, 57, each with a sensor as shown in FIG. 6, for detecting evolution of at least an environmental parameter; and at least a control system 2 with at least a probe corrected set-off value connected to at least one of the probes for setting-off the probe when the at least one of the environmental factors evolves past at least one of the corrected probe set-off values. The autosensitive detector 1 also includes at least one of the corrected probe set-up values is calculated by measuring a first noncorrected probe set-up value of the at least one environmental parameter using the at least one sensor 61, 62 and correcting the first noncorrected probe set-up value by a first sensitivity correction factor.

In yet another embodiment, the at least one probe is an RTD input probe or a thermistor probe. In another embodiment, the detector 1 includes at least two probes, the first for detecting evolution of temperature, and the second for detecting the evolution of the resistance of a fluid.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. An autosensitive detector, comprising:
   a probe with a sensor for automatically detecting the evolution of an environmental parameter; and
   a control system with a casing having at least a probe connection, the control system with a probe corrected set-off value connected to the probe via the probe connection for automatically setting off the probe when the environmental factor evolves past the corrected probe set-off value,
   wherein the corrected probe set-off value is automatically calculated by measuring a first noncorrected probe set-off value based on a baseline resistance of the environmental parameter using the sensor, and correcting the noncorrected probe set-off value by a sensitivity correction factor.

2. The autosensitive detector of claim 1, wherein the sensitivity correction factor is a value within the range of 1 to 10 if the corrected probe set-off value is greater than the noncorrected probe set-off value.

3. The autosensitive detector of claim 2, wherein the sensitivity correction factor is a value within the range of 1 to 1.2.

4. The autosensitive detector of claim 3, wherein the sensitivity correction factor is approximately 1.1.

5. The autosensitive detector of claim 1, wherein the sensitivity correction factor is a value within the range of 0.8 to 1.0 if the corrected probe set-off value is smaller than the noncorrected probe set-off value.

6. The autosensitive detector of claim 5, wherein the noncorrected probe set-off value is the resistance between the fluid and the ground resistance.

7. The autosensitive detector of claim 1, wherein the probe is a fluid-to-ground resistance probe mounted to a tube with a fluid, and the environmental parameter is the electrical conductivity of the fluid in the tube, and the probe includes rods for measuring the conductivity between the rods.

8. An autosensitive measurement system with a set-off value, comprising:
   an autosensitive detector with a first connector, a probe with a sensor for automatically detecting the evolution of an environmental parameter, a ground, a command with a noncorrected set-off value based on a baseline resistance between the probe and the ground, and a sensitivity correction factor; and a control system with a casing, the control system with an interface and a second connector connected to the first connector for modifying the sensitivity correction factor via the interface, wherein a corrected set-off value is automatically calculated at each initialization of the autosensitive detector by multiplying the measure of resistance and the sensitivity correction factor.

9. The autosensitive measurement system of claim 8, wherein the sensitivity correction factor is a value within the range of 1 to 10.

10. The autosensitive measurement system of claim 9, wherein the sensitivity correction factor is a value within the range of 1 to 1.2.

11. The autosensitive measurement system of claim 10, wherein the sensitivity correction factor is approximately 1.1.

12. The autosensitive measurement system of claim 11, wherein the sensitivity correction factor is a value within the range of 0.8 to 1.0 if the set-off value is inferior than the resistance.

13. The autosensitive measurement system of claim 8, wherein the probe is a fluid to ground electrical conductivity probe measuring the resistance.

14. An autosensitive detector, comprising:
at least a probe each with a sensor for automatically detecting evolution of at least an environmental parameter; and
at least a control system with a casing having at least a probe connection, the at least a control system with at least a probe corrected set-off value connected to at least one of the probes via the probe connection for setting-off the probe when the at least one of the environmental factors evolves past at least one of the corrected probe set-off values, wherein at least one of the corrected probe set-off values is automatically calculated by measuring a first noncorrected probe set-off value based on a baseline resistance of the at least one environmental parameter using the at least one sensor, and correcting the first non-corrected probe set-off value by a first sensitivity correction factor.

15. The autosensitive detector of claim 14, wherein at least the probe is a RTD input probe.

16. The autosensitive detector of claim 14, wherein at least the probe is a thermistor probe.

17. The autosensitive detector of claim 14, comprising at least two probes, the first for detecting evolution of temperature and the second for detecting the evolution of the resistance of a fluid.

18. The autosensitive detector of claim 14, wherein the first sensitivity correction factor is a value within the range of 1 to 10 if the at least one corrected probe set-off value is greater than the first noncorrected probe set-off value.

19. The autosensitive detector of claim 18, wherein the sensitivity correction factor is a value within the range of 1 to 1.2.

20. The autosensitive detector of claim 19, wherein the sensitivity correction factor is approximately 1.1.

* * * * *